(No Model.)

J. P. MADDOX.
TROLLEY HEAD.

No. 504,734.  Patented Sept. 12, 1893.

Witnesses
Ed Withington Robinson
Alice E. Whelan

Inventor.
Joshua P. Maddox
By Elgin C. Verrill
Atty

UNITED STATES PATENT OFFICE.

JOSHUA P. MADDOX, OF WESTBROOK, MAINE.

TROLLEY-HEAD.

SPECIFICATION forming part of Letters Patent No. 504,734, dated September 12, 1893.

Application filed October 7, 1892. Serial No. 448,137. (No model.)

*To all whom it may concern:*

Be it known that I, JOSHUA P. MADDOX, a citizen of the United States, residing at Westbrook, in the county of Cumberland and State of Maine, have invented certain new and useful Improvements in Trolley-Heads; and I do hereby declare the following to be a full, clear, and exact description of the invention, such as will enable others skilled in the art to which it appertains to make and use the same, reference being had to the accompanying drawings, in which—

Figure 1:
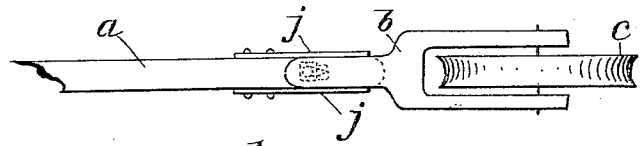
Figure 2:
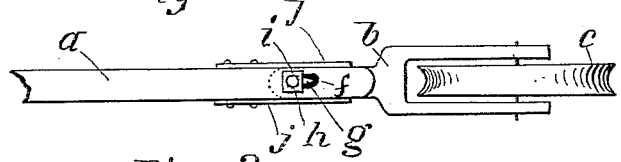
Figure 3:
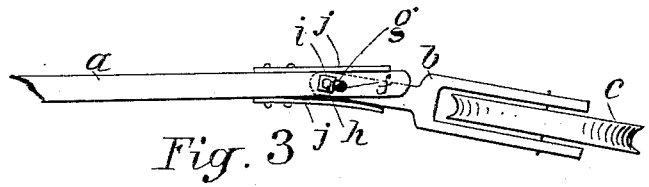
Figure 4:
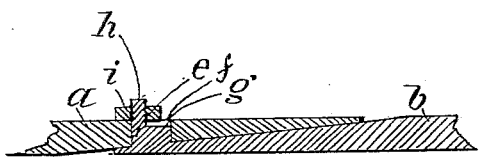
Figure 5:
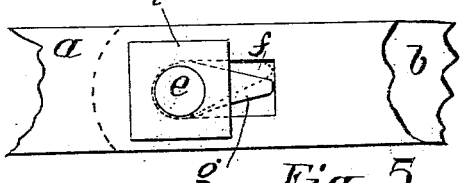

Figure 1, is a top plan view of my improved trolley. Fig. 2, is a bottom plan of the same. Fig. 3, is a bottom plan of the same showing the trolley head turned to one side. Fig. 4, is a sectional view showing the method of jointing the trolley head to the pole. Fig. 5, is a bottom plan view of the same.

The same letters refer to like parts.

My invention relates to improvements in trolleys and consists in pivotally jointing the trolley head to the pole so that the head thereby is capable of lateral movement relative to said pole, in means for returning the head to its normal position and in other details of construction hereinafter more fully described.

In said drawings $a$ represents a trolley pole of any suitable construction, $b$ the trolley head and $c$ the wheel mounted on said head. The trolley head is attached to the arm by means of a pivot bolt $e$ passing through a longitudinal slot $f$ in the end of the trolley pole. The pivot bolt has a key $g$ thereon which limits the lateral motion of the trolley head on its pivot and terminates in a screw threaded bolt $h$ projecting through said slot and adapted to receive a nut $i$. In order to form a convenient bearing and steady support for the head the ends of the trolley head and trolley pole overlap each other as seen in Fig. 4. The contact faces of the trolley pole and head may be diagonal to the line of the pole or parallel with said line as is found most convenient. Attached to each side of the trolley pole at or near the pivoted joint are springs $j$ against which the trolley head presses when it is turned laterally on its pivot as shown in Fig. 3, and which constantly tends to return the trolley head to its normal position.

This invention is adapted for use on any other trolley pole. Other means of attaching the trolley head to the trolley pole may be employed provided only that the trolley head must be capable of moving laterally with respect to the trolley pole, be limited in its lateral movement by some convenient means, and have springs for returning the head to its normal position when the lateral pressure is removed from the head as is the case as soon as the trolley reaches the straight wire again.

In trolley heads as now constructed, in which the trolley head is rigidly attached to the pole or adapted to turn horizontally on the end thereof, there is a constant and rapid wearing out of the bearings and wheel by reason of the truck rubbing against said bearings when the trolley is passing around a curve and over switches because of the inability of the trolley head to accommodate itself to said curves and also a rapid wearing of the overhead wire at said curves and switches and there is great danger also of the trolley leaving the wire at these points. The present invention very materially overcomes these objections inasmuch as when the car is going around a curve the trolley head is easily turned to one side by very little pressure and the wear on the truck, wheel bearings and wire is very much lessened and as soon as the bend is passed the springs at the side immediately return the trolley head to its normal position.

The trolley head being pivotally attached to the pole, as in the present invention, accommodates itself readily to any lateral movement of the car. If the trolley head and pole were rigid, as the car sways from side to side the side of the trolley wheel would bear against the wire and the friction and wear greatly increased thereby, because it could not be adjusted except by movement at the foot of the trolley pole. The same result is gained as the trolley passes into and out of the switches.

Having thus described my invention and its use, what I claim is—

1. The combination with a trolley pole of a trolley head pivotally attached thereto, the end of the trolley head overlapping the end of the pole and adapted to move laterally thereon, and springs constantly tending to keep said trolley head parallel with said pole, substantially as and for the purposes set forth.

2. The combination with a trolley pole, of a trolley head pivotally attached thereto, the end of the trolley head overlapping the end of the trolley pole and adapted to move laterally thereon, a slot in the end of the pole and a pivot bolt attached to the trolley head and adapted to project through said slot, and means for limiting the lateral motion of said trolley head relative to the pole, substantially as and for the purposes set forth.

3. The combination with a trolley pole of a trolley head attached thereto, the end of the head overlapping the end of the pole and adapted to move laterally thereon, a slot in the end of the pole, a pivot bolt carried by the trolley head and adapted to project through said slot, means for limiting the lateral motion of said head relative to the pole and springs constantly tending to keep said head parallel with said pole, substantially as and for the purposes set forth.

In testimony whereof I affix my signature in presence of two witnesses.

JOSHUA P. MADDOX.

Witnesses:
  ELGIN C. VERRILL,
  ALICE E. WHELAN.